(12) United States Patent
Xu

(10) Patent No.: US 9,560,072 B1
(45) Date of Patent: *Jan. 31, 2017

(54) DISCOVERING AND SELECTING CANDIDATES FOR SINKHOLING OF NETWORK DOMAINS

(71) Applicant: Palo Alto Networks, Inc., Santa Clara, CA (US)

(72) Inventor: Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/724,679

(22) Filed: May 28, 2015

Related U.S. Application Data

(63) Continuation-in-part of application No. 14/068,272, filed on Oct. 31, 2013, now Pat. No. 9,405,903.

(51) Int. Cl.
*H04L 29/06* (2006.01)
*H04L 12/24* (2006.01)

(52) U.S. Cl.
CPC ........... *H04L 63/1475* (2013.01); *H04L 41/12* (2013.01); *H04L 63/145* (2013.01)

(58) Field of Classification Search
CPC .................................................. H04L 63/1475
USPC ......................................................... 726/24
See application file for complete search history.

(56) References Cited

U.S. PATENT DOCUMENTS

| | | | |
|---|---|---|---|
| 8,561,177 B1 | 10/2013 | Aziz et al. | |
| 8,566,928 B2 | 10/2013 | Dagon et al. | |
| 8,631,489 B2 * | 1/2014 | Antonakakis | H04L 61/1511 709/223 |
| 2004/0073640 A1 | 4/2004 | Martin et al. | |
| 2008/0028463 A1 | 1/2008 | Dagon et al. | |
| 2009/0089426 A1 | 4/2009 | Yamasaki et al. | |
| 2011/0283359 A1 | 11/2011 | Prince et al. | |
| 2011/0283361 A1 | 11/2011 | Perdisci et al. | |
| 2012/0303808 A1 | 11/2012 | Xie | |
| 2013/0080574 A1 | 3/2013 | Prince et al. | |

(Continued)

FOREIGN PATENT DOCUMENTS

WO        2007050244        5/2007

OTHER PUBLICATIONS

NPL—Guy Bruneau, DNS Sinkhole, GIAC, Sans Institute, Aug. 7, 2010.*

(Continued)

*Primary Examiner* — Longbit Chai
(74) *Attorney, Agent, or Firm* — Van Pelt, Yi & James LLP

(57) ABSTRACT

Techniques for discovering and selecting candidates for sinkholing of network domains are provided. In some embodiments, a process for discovering and selecting candidates for sinkholing of network domains includes collecting passive DNS data from a plurality of security devices to discover candidates for sinkholing of domain names; selecting one or more domain names that are most commonly queried by distinct client devices based on the passive DNS data, wherein each of the one or more domain names is not yet registered; and automatically registering each of the one or more domain names with a domain registry to a sinkholed IP address in order to sinkhole each of the one or more domain names.

17 Claims, 11 Drawing Sheets

(56) References Cited

U.S. PATENT DOCUMENTS

| | | | | |
|---|---|---|---|---|
| 2013/0174253 A1* | 7/2013 | Thomas | .............. | H04L 63/1416 726/22 |
| 2013/0232574 A1* | 9/2013 | Carothers | ............... | G06F 21/56 726/22 |
| 2014/0143825 A1 | 5/2014 | Behrendt et al. | | |
| 2014/0245436 A1 | 8/2014 | Dagon et al. | | |
| 2014/0283063 A1 | 9/2014 | Thompson et al. | | |
| 2015/0007250 A1 | 1/2015 | Dicato et al. | | |
| 2015/0143504 A1 | 5/2015 | Desai et al. | | |

OTHER PUBLICATIONS

Guy Bruneau, DNS Sinkhole, Sans Institute, pp. 1-41, Aug. 7, 2010.
Vishnu Teja Kilari, Thesis, Detection of Advanced Bots in Smartphones Through User Profiling, Dec. 2013.
Xu et al., We Know it Before You Do: Predicting Malicious Domains, Virus Bulletin Conference Sep. 2014.
Palo Alto Networks, We Know it Before You Do: Predicting Malicious Domains, retrieved on Jun. 22, 2015.
Pedro Marques da Luz, Thesis, Botnet Detection Using Passive DNS, 2013/2014.
Seung Won Shin, Protecting Networked Systems from Malware Threats, Aug. 2013.
Christian Rossow, Thesis, Using Malware Analysis to Evaluate Botnet Resilience, Apr. 23, 2013.

* cited by examiner

US 9,560,072 B1

DISCOVERING AND SELECTING CANDIDATES FOR SINKHOLING OF NETWORK DOMAINS

CROSS REFERENCE TO OTHER APPLICATIONS

This application is a continuation in part of co-pending U.S. patent application Ser. No. 14/068,272 entitled SINKHOLING BAD NETWORK DOMAINS BY REGISTERING THE BAD NETWORK DOMAINS ON THE INTERNET filed Oct. 31, 2013, which is incorporated herein by reference for all purposes.

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
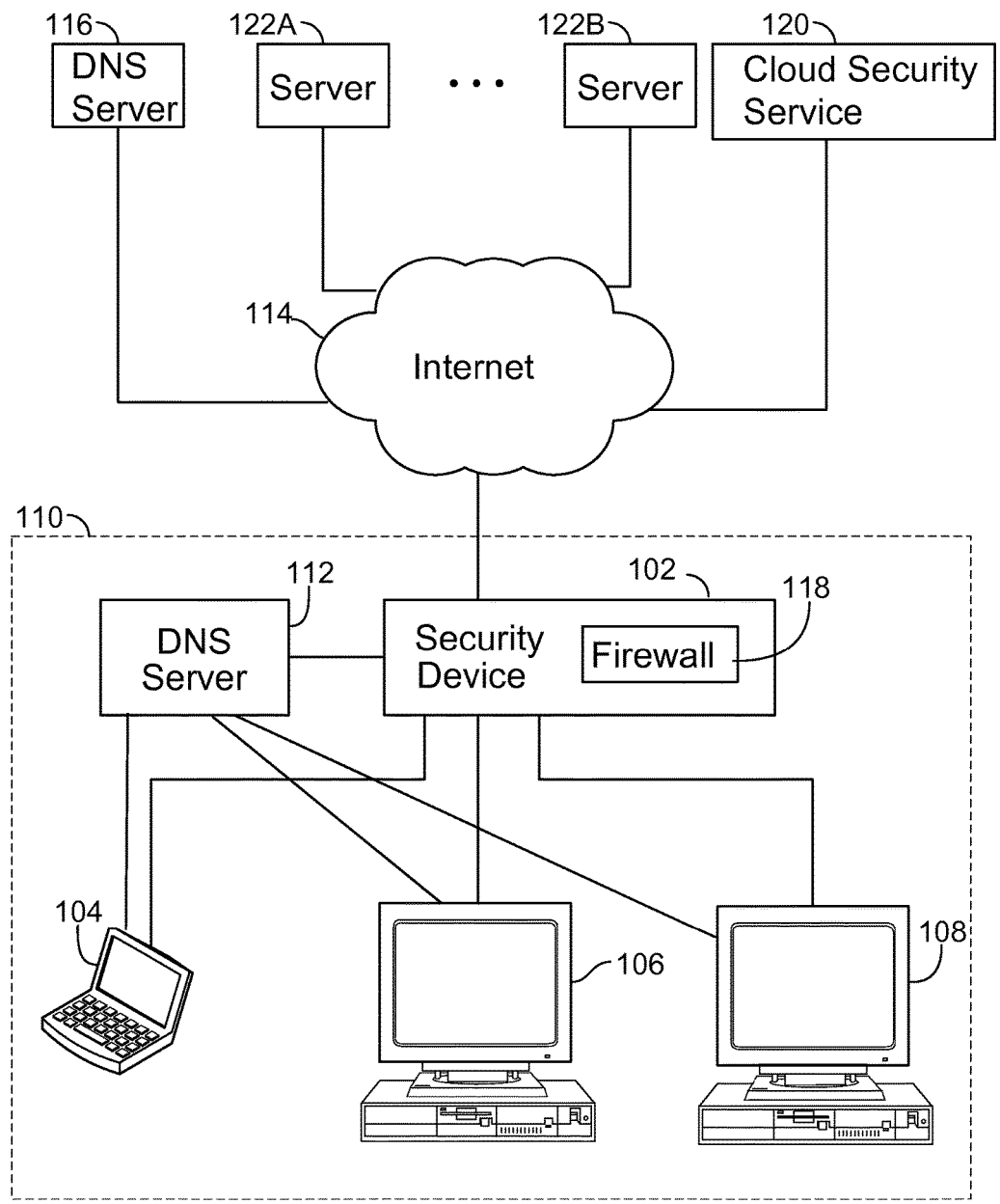
FIG. 1 is a functional block diagram illustrating an architecture for discovering and selecting candidates for sinkholing of network domains in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name on the Internet.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnetsite.com. Various commercial efforts as well as open project efforts exist to provide listings of network domains that are known to be used to distribute or propagate malware. Some approaches use such network domain listings to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Thus, existing approaches fail to identify hosts that are infected with malware. Also, existing approaches fail to determine that a given host that attempts to connect to a network domain is infected with an identified malware (e.g., a previously identified, known version of malware).

Sinkholing generally refers to a technique for routing traffic (e.g., network communications) to a valid IP address. For example, a network device (e.g., server or appliance) associated with the valid IP address can receive the traffic that was directed to the sinkholed IP address that is associated with the network domain. The network device that receives the traffic can analyze the traffic. Based on the analysis of the traffic, the network device can then perform an action (e.g., reject bad packets or perform some other action).

If a domain associated with malware (e.g., a malware domain) is a non-existent domain (NXdomain), then sinkholing that domain would typically require registering the domain in order to associate the domain with a valid IP address, such as an IP address controlled by a security provider or another entity that is not associated with the malware author. Thus, sinkholing techniques typically require actually registering such a malware domain. However, determining which network domains to register is a challenging and time-consuming task.

What are needed are new and improved techniques for identifying which network domains to register on the Internet for performing the disclosed sinkholing techniques for improved computer/network security.

Accordingly, techniques for discovering and selecting candidates for sinkholing of network domains are provided.

In some embodiments, a system, process, and/or computer program product for discovering and selecting candidates for sinkholing of network domains includes collecting passive DNS data from a plurality of security devices to discover candidates for sinkholing of domain names; selecting one or more domain names that are most commonly queried by distinct client devices based on the passive DNS data, wherein each of the one or more domain names is not yet registered; and automatically registering each of the one or more domain names with a domain registry (e.g., a Domain Name Registrar for the Internet) to a sinkholed IP address in order to sinkhole each of the one or more domain names.

In one embodiment, the passive DNS data from the plurality of security devices includes DNS responses to DNS queries for non-existent domains (NXDOMAINs), each of the DNS responses includes a destination IP address that corresponds to a client device requesting a domain name resulting in an NXDOMAIN DNS response, and the distinct client devices are determined based on distinct IP addresses associated with DNS responses provided in the passive DNS data.

In one embodiment, the passive DNS data from a plurality of security devices is collected daily; and wherein the selected one or more domain names are the most commonly queried by distinct client devices based on the passive DNS data over a period of two or more consecutive days.

In one embodiment, the system, process, and/or computer program product for discovering and selecting candidates for sinkholing of network domains further includes applying a Domain Generation Algorithm (DGA) filter to remove any DGA generated domain names from the candidates for sinkholing of domain names, wherein the DGA filter includes a plurality of DGA generated domain names based on an emulated analysis of malware.

In one embodiment, the system, process, and/or computer program product for discovering and selecting candidates for sinkholing of network domains further includes receiving a plurality of malware samples; and executing each of the plurality of malware samples to identify a plurality of DGA generated domain names.

In one embodiment, the system, process, and/or computer program product for discovering and selecting candidates for sinkholing of network domains further includes filtering the candidates for sinkholing of domain names to remove any domain names that were not queried by a threshold number of distinct client devices based on the passive DNS data. For example, domain names that were not queried by at least n number of distinct hosts (e.g., five different hosts, ten different hosts, or some other number of different hosts) can be removed from a listing of candidates for sinkholing.

In one embodiment, the system, process, and/or computer program product for discovering and selecting candidates for sinkholing of network domains further includes determining a first network domain, of the one or more domain names, is a bad network domain, wherein the bad network domain is determined to be associated with an identified malware, and wherein the bad network domain is sinkholed by registering the bad network domain with a first sinkholed IP address; and identifying a host that is infected with the identified malware based on an attempt by the host to connect to the first sinkholed IP address.

In one embodiment, the system, process, and/or computer program product for discovering and selecting candidates for sinkholing of network domains further includes receiving additional passive DNS data from a third party DNS data source; and aggregating the additional passive DNS data from a third party DNS data source with the collected passive DNS data from the plurality of security devices for analysis for discovering and selecting candidates for sinkholing of network domains.

In one embodiment, the system, process, and/or computer program product for discovering and selecting candidates for sinkholing of network domains further includes generating a log for each attempted host connection to the sinkholed IP address; and reporting a plurality of hosts that attempted to connect to the sinkholed IP address.

For example, a cloud security service provider can register the bad network domain with a valid IP address that is associated with, for example, a server or appliance controlled by the cloud security service provider. The server or appliance can be configured with various open multiple ports, such as port 80, port 8080, port 344, and/or other ports, and can also be configured to listen for connection requests. The cloud security service provider can thereby monitor and log attempts by clients to connect to the sinkholed bad network domain. Accordingly, this approach allows the cloud security service provider to identify clients that are infected with identified malware based on the logged attempts by such clients (e.g., logging session records, which can be stored for analysis and reporting) to connect to the sinkholed bad network domain.

As another example, malware can be automatically analyzed using DNS network traffic emulation techniques to determine that the malware is associated (e.g., uniquely associated) with a bad network domain, such as an NXDOMAIN. The bad network domain can be registered to a valid IP address that a security entity (e.g., a security provider) controls, such that the bad network domain is sinkholed to an IP address (e.g., the sinkholed IP address) that the security entity controls. As a result, traffic from hosts (e.g., host devices, such as a computer, laptop, tablet, smart phone, server, and/or another type of computing device) that is resolved to this IP address can be analyzed by a network device controlled by the security entity, which can then, for example, determine which clients attempted to connect to that bad network domain (e.g., log which clients attempted to connect to the bad network domain and how many times) and/or perform various other actions. As an example, by analyzing such logged traffic, the security provider can determine which hosts and networks (e.g., hosts, ISPs, and/or company networks, even if such are not customers of the cloud security service) are infected with the known malware (e.g., identified malware) based on logged attempts to connect to the bad network domain. Entities that are associated with such hosts and networks (e.g., even if such are not customers of the cloud security service, but which can be contacted as a prospective customer by the security provider, which can inform such prospective customer of which host(s) may be infected with the identified malware) can be informed of the infection with the identified malware by the security provider based on the analyzed log traffic. In one implementation, the cloud security service provides a network device that is configured with the sinkholed IP address, and the network device is further configured to not provide any responses to requests from the infected hosts except for completing an initial connection setup (e.g., TCP handshake).

In one embodiment, discovering and selecting candidates for sinkholing of network domains further includes determining that the network domain is not a registered network domain. In one embodiment, discovering and selecting candidates for sinkholing of network domains further includes registering the network domain with a domain registry (e.g., a Domain Name Registrar for the Internet) to the sinkholed IP address in order to sinkhole the network domain. For example, the network domain can be registered with a domain registry to the sinkholed IP address in order to sinkhole the network domain, which was determined to be a malware domain (e.g., a bad domain as it was previously determined to be associated with malware, such as using various techniques such as described herein).

In one embodiment, a log for each attempted host connection to the sinkholed IP address can be generated. For example, the log can be used to determine which hosts are infected with the identified malware based on the indication that such hosts attempted to connect to the sinkholed IP address.

In one embodiment, discovering and selecting candidates for sinkholing of network domains further includes: receiving a plurality of malware samples; and executing each of the plurality of malware samples to identify a plurality of bad network domains. For example, a cloud security service can receive a malware sample from a security device (e.g., a security appliance or other security device that includes a firewall). The malware sample can be automatically analyzed using various techniques, including executing the malware sample in a virtual execution environment to monitor network activities in order to identify network domains that the malware sample attempts to connect to during execution. If the malware sample is determined to be malware (e.g., identified malware), then these network domains can then be determined to be bad network domains associated (e.g., uniquely associated) with the identified malware. In some cases, a signature can be generated for each of these bad network domains. The security cloud service can distribute the signature to a plurality of security devices (e.g., security devices that are used by customers of the cloud security service). The signatures can then be used by the cloud security service to identify candidate bad network domains for sinkholing based on a number of attempts by hosts that trigger each such signature (e.g., based on a number of hosts that attempt to connect to a particular bad network domain). This approach can be used to identify candidate bad network domains for sinkholing using various techniques further described herein, which also allows for a more efficient and focused sinkholing of bad network domains (e.g., as malware can generate many different network domains, such as by using domain generation algorithms (DGAs), many of which are generated for evasion detection purposes and take-down evasion purposes, and are not actually or frequently used to attempt to connect to by many or any of the malware samples executing in the wild).

In one embodiment, discovering and selecting candidates for sinkholing of network domains further includes determining that a plurality of connections were attempted to the bad network domain (e.g., an NXDOMAIN). For example, determining that a threshold number of connections were attempted to the bad network domain can be implemented using traffic analysis techniques (e.g., implemented using a firewall), such as by logging signature matches (e.g., a DNS signature that is implemented using a firewall, in which the DNS signature was generated for identifying attempted connections to the bad network domain) indicating that one or more hosts attempted to connect to the bad network domain. This approach can be used, in combination with various other disclosed techniques, to indicate that the bad network domain (e.g., NXDOMAIN) can be a good candidate for sinkholing. In some implementations, if a threshold number of connections was attempted to the bad network domain (e.g., requiring a threshold number of connections can be used to disregard noise that can result from mistyped network domain queries and DGA randomly generated network domains that were not commonly queried by the malware), then the bad network domain can be determined to be a candidate for sinkholing, using various techniques described herein. This approach can be used to verify which of the initially identified set of bad network domains (e.g., NXDOMAINs) are candidates for sinkholing by registering with a valid IP address (e.g., an IP address owned by the cloud security service provider) to effectively sinkhole such bad network domains.

In one embodiment, discovering and selecting candidates for sinkholing of network domains further includes not responding to a connection request from a host to the sinkholed IP address.

In one embodiment, discovering and selecting candidates for sinkholing of network domains further includes receiving a malware sample (e.g., a file that can include an executable file, a Microsoft Office® file, an Adobe PDF® file, Java file, or another format of file, which can be received from a customer) at a cloud security service; automatically analyzing the malware sample (e.g., monitoring behavior using various emulation techniques to determine if the malware sample can be identified as malware (identified malware), and monitoring network traffic to log network traffic, including, for example, DNS traffic); and if the malware sample is determined to be malware, analyzing network domains from logged DNS network traffic (e.g., using DNS signatures generated for bad network domains identified as associated with the identified malware based on analysis of the malware during emulation) at a security device (e.g., a security appliance or server that includes a firewall) to automatically determine one or more candidate network domains (e.g., bad network domains, also referred to herein as malware domains) for sinkholing (e.g., based on a logged number of triggered DNS signatures that exceeds a threshold number, for example, during a predefined period of time).

These and other examples and techniques for discovering and selecting candidates for sinkholing of network domains will now be further described below.

FIG. 1 is a functional block diagram illustrating an architecture for discovering and selecting candidates for sinkholing of network domains in accordance with some embodiments. As shown, a security device 102 is at the perimeter of a protected network 110, which includes client devices (e.g., clients) 104, 106, and 108. For example, security device 102 can include a firewall function, such as firewall 118 as shown, to protect the network and clients within network 110, which is in communication with the Internet 114 and various servers, such as DNS server 116, and other Internet resources/servers shown as 122A and 122B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities. As is also shown, Internet resources/servers shown as 122A and 122B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPv4) and 2001:db8:0:1234:0:567:8:1 (for IPv6) (e.g., by responding to a DNS query from a client device for that example.com domain name with an IPv4/IPv6 address that is locally cached for that domain name). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown for the network architecture for network 110). In contrast, DNS requests from clients 104, 106, and 108 to local DNS server 112 are not required to pass through security device 102 as shown for the network architecture for network 110. As similarly discussed above, if a user or client attempts to perform a DNS lookup or host command on an unregistered or invalid domain name, such as examplefakedomain.com, then an error can be received indicating that such is a non-existing domain name, or in other words, that such is a non-existent domain (NXDOMAIN) (e.g., by responding to a DNS query from a client device for that examplefakedomain.com domain name with a DNS response of NXDOMAIN to indicate that such is a non-existing/non-registered domain name).

In particular, security device 102 can be used for implementing various techniques for sinkholing bad network domains by registering the bad network domains on the Internet as described herein with respect to various embodiments. For example, security device 102 can periodically send malware samples to cloud security service 120, which can use such malware samples to identify malware and associated bad network domain(s) (if any). As another example, security device 102 can implement signatures (e.g., network signatures, such as DNS signatures) for detecting client requests for bad network domains, which can then be logged and periodically communicated to cloud security service 120. As yet another example, security device 102 can receive signatures (e.g., network signatures, such as DNS signatures) for detecting client requests for bad network domains from cloud security service 120 and implement the signatures to log events based on such signatures being triggered based on monitored network traffic passing through security device 102 and which can periodically communicate to cloud security service 120 such that cloud security service 120 can use such information to identify a set of candidate bad network domains for sinkholing.

In one embodiment, a set of candidate network domains for sinkholing is provided as input to a further analysis based on various techniques for discovering and selecting network domains for sinkholing, such as further described below with respect to FIGS. 2 and 8. For example, a subset of the candidate network domains can be selected for sinkholing using the disclosed techniques, and the selected subset of the candidate network domains can each be registered on the Internet, which can be implemented using security device 102 and cloud security service 120, such as further described herein.

In one embodiment, sinkholing bad network domains by registering the bad network domains on the Internet is implemented using security device 102 and cloud security service 120. For example, security device 102 (e.g., an integrated security appliance/gateway/server) can communicate with cloud security service 120 (e.g., using secure communications, such as encrypted communication techniques) to receive security related content updates (e.g., DNS related signatures, bad network domain related signatures, and/or policy/rules) and/or to provide malware samples, logged information (e.g., logged attempts to communicate to bad network domains observed based on triggered bad network domain signatures and/or DNS signatures, and/or logged attempts to communicate with non-existent domains based on NXDOMAIN responses to DNS queries), and/or other information. As another example, cloud security service 120 (e.g., using secure communications, such as encrypted communication techniques) can report (e.g., to a network or security administrator associated with network 110) that a host (e.g., client device 104, 106, or 108) is infected with identified malware based on a logged attempt(s) by that host(s) to communicate with a sinkholed IP address that is associated with a bad network domain. As will now be apparent, some or all of the functions described above with respect to FIG. 1 can be assisted by or implemented in whole or in part by cloud security service 120. In some implementations, cloud security service 120 can, for example, reduce the processing on security device 102.

Figure 2:
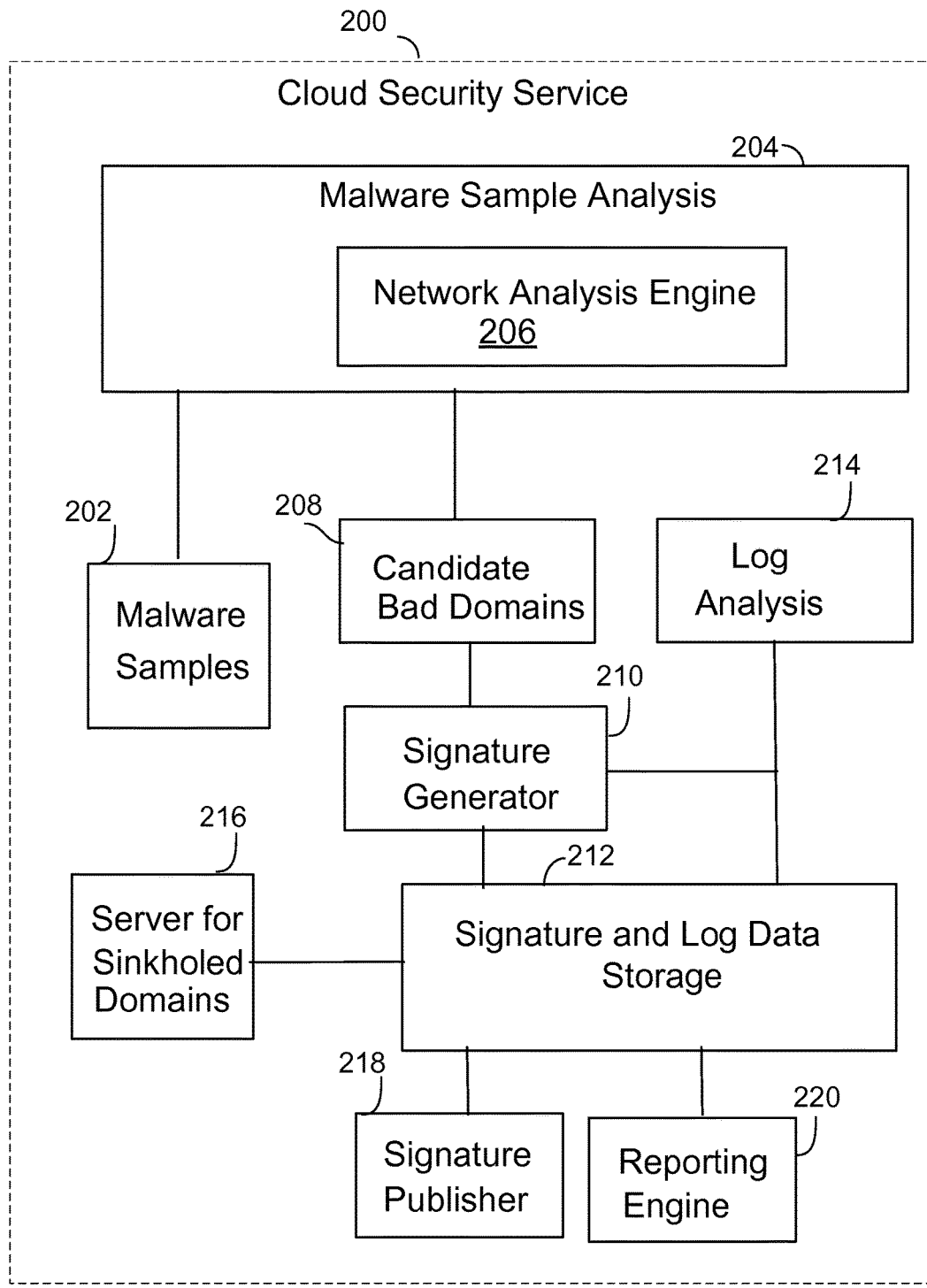
FIG. 2 is a functional block diagram illustrating a cloud security service for discovering and selecting candidates for sinkholing of network domains in accordance with some embodiments.

FIG. 2 is a functional block diagram illustrating a cloud security service for discovering and selecting candidates for sinkholing of network domains in accordance with some embodiments. In particular, cloud security service 200 is in communication with the Internet. For example, cloud security service 120 of FIG. 1 can be implemented as cloud security service 200 as shown in FIG. 2.

Referring to FIG. 2, cloud security service 200 includes malware samples 202 (e.g., executable files, Microsoft Office® files, Adobe PDF® files, Java files, and/or other types of files), which can be received from various customers (e.g., firewall 118 as shown in FIG. 1 and/or other firewalls or security devices from one or more customers of the cloud security service). Malware samples 202 are provided to malware sample analysis 204. Malware sample analysis 204 includes a network analysis engine 206. For example, when executing a malware sample using the malware sample analysis 204, which can be implemented as a virtualized environment for dynamic analysis of malware, whether the malware sample is determined to be malware can be performed using various malware detection techniques (e.g., based on identification of malicious behaviors, such as malicious network activity, exploits, software vulnerabilities, and/or other malicious behaviors including using heuristic-based behavioral analysis techniques). Also, malware sample analysis 204, using network analysis engine 206, can identify malware domains (if any) that the malware sample attempts to access, which can be logged and sent to candidate bad network domains 208 (e.g., by logging all DNS/domain query traffic during emulation of the identified malware, which generates a source of a candidate bad network domains list associated with the identified malware). For example, whether each of the candidate bad network domains has been registered (e.g., by the malware developer) can be determined (e.g., if a DNS lookup receives an NXDOMAIN response, then it can be determined that the candidate bad network domain has not been registered). In some implementations, the cloud security service can register any such unregistered bad network domains to sinkhole such bad network domains (e.g., using sinkholed IP addresses, that is, valid IP addresses that are associated with, for example, one or more servers controlled by cloud security service 200, such as server 216 as shown). This approach also can uniquely associate an identified malware sample with one or more bad network domains, such that a host attempt to connect to such bad network domains (e.g., NXDOMAINS) can be used to determine that such hosts are infected with the identified malware sample. For example, such signatures are triggered by a client device (e.g., client device 104, 106, or 108 as shown in FIG. 1) attempting to connect to such an NXDOMAIN that triggers a signature implemented by the local firewall (e.g., firewall 118 as shown in FIG. 1), which can then also be used to determine that the client device is infected with identified malware, such that a responsive action can be performed (e.g., the client device can be disinfected, quarantined, reported to a network/security administrator for the network, the client device's attempt(s) to connect to the bad network domains(s) can be blocked, and/or some other responsive action).

In other cases, further analysis can be performed to determine which of the candidate bad network domains should be registered for sinkholing, as further described below. In some implementations, cloud security service 200 uses a signature generator 210 to generate signatures for candidate bad domains 208. These signatures are stored in signature and log data storage 212 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 200 using signature publisher 218. For example, if during emulation analysis of malware-Sample-X (e.g., including logging DNS traffic during an instrumented virtualized emulation of malware-Sample-X), that malware sample attempts to connect to malware-bad-site-1.com, malware-bad-site-2.com, and malware-bad-site-3.com, then signatures (e.g., DNS signatures) can be generated for each of those candidate bad network domains. These signatures can be sent to firewalls of multiple customers of cloud security service 200, which can then log and report back to cloud security service 200 any attempts that such customer firewalls identify hosts attempting to connect to any of such candidate bad network domains, which can also be stored in signature and log data storage 212. Log analysis engine 214 can periodically analyze such received log data to determine which candidate bad network domains are bad network domains that malware-Sample-X (e.g., executing in the wild) actually attempts or more commonly attempts to connect to in order to focus on such candidate bad network domains for sinkholing. Based on this further analysis to focus on the most relevant candidate bad network domains, the cloud security service can then register such unregistered bad network domains, or (if already registered by the malware developer) attempt to change the registration, to sinkhole such bad network domains (e.g., using sinkholed IP addresses that are associated with one or more servers controlled by cloud security service 200, such as server 216 as shown). Thus, such further analysis can be used to determine which of the candidate bad network domains should be registered for sinkholing, which can be a more efficient approach as malware sometimes uses DGA techniques and other malware detection evasion techniques as discussed above. Accordingly, this approach allows cloud security service 200 to selectively register or change DNS registrations on bad network domains that were observed to have exceeded, for example, a threshold number of attempted hits (e.g., queries for attempted connections, such as during a predefined period of time) by hosts (e.g., infected with the identified malware performing in the wild).

As is also shown in FIG. 2, cloud security service 200 provides a server for sinkholed domains 216 (e.g., or multiple servers or appliances) that can be associated with one or more sinkholed IP addresses for bad network domains using the above described techniques. Any attempts by hosts (e.g., clients 104, 106, or 108 as shown in FIG. 1, or other hosts, even if such are hosts that are not associated with customers of the cloud security service) can be determined using server for sinkholed domains 216 and logged to signature and log data storage 212 (e.g., or in some implementations, stored in a separate data store). Cloud security service 200 can uniquely associate an identified malware sample with one or more bad network domains, such that host attempts to connect to such bad network domains can be used to determine that such hosts are infected with the identified malware. Reporting engine 220 is configured to automatically report to customers (e.g., or others who may not be current customers) which host(s) are infected with identified malware based on logged attempts to connect to sinkholed IP addresses that are associated with bad network domains. Accordingly, this approach allows the cloud security service provider to use sinkholed domains to report which clients are infected with identified malware even for hosts that are not associated with a customer, as the cloud security service provider controls the IP addresses for the sinkholed domain such that traffic is directed to a network resource (e.g., server 216 as shown in FIG. 2) for monitoring, logging, and reporting which hosts attempt connections (e.g., client devices infected with malware-Sample-X that is sending C&C traffic to malware-bad-site-3.com) to such sinkholed bad domains.

Figure 3:
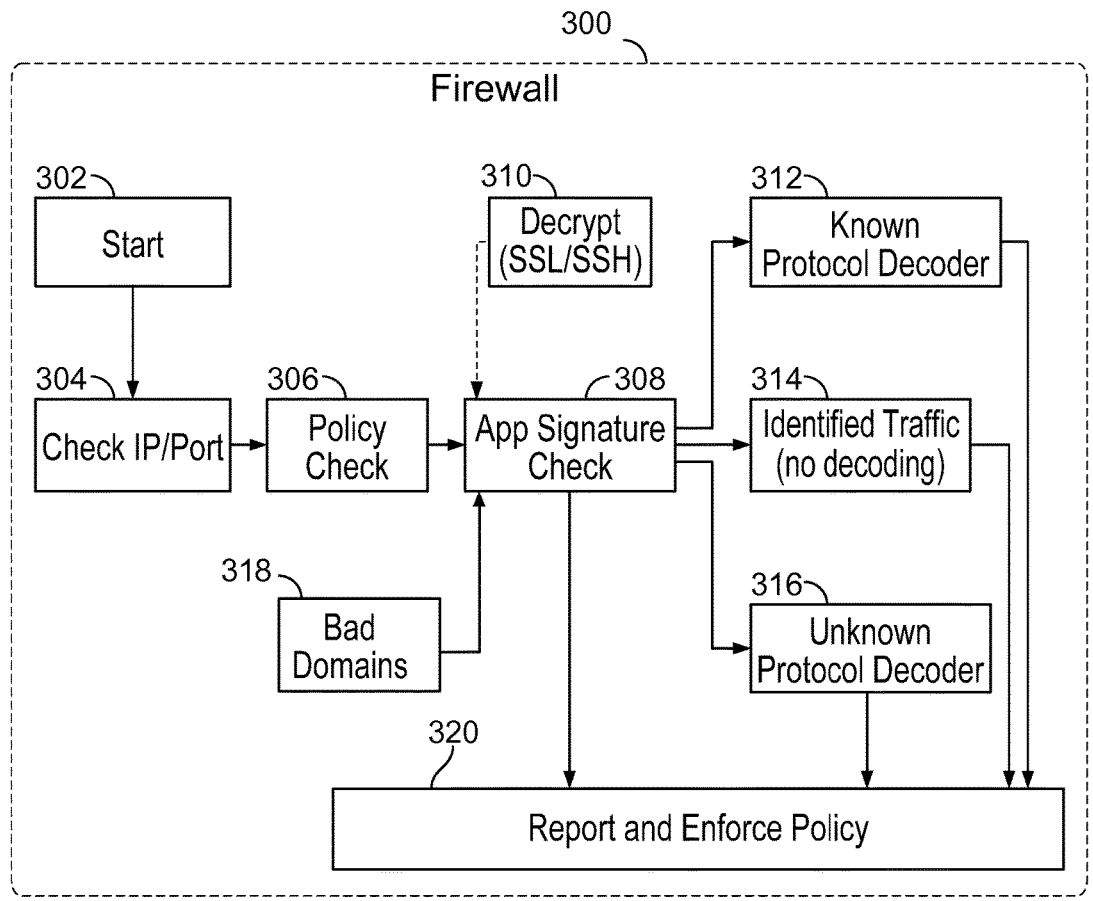
FIG. 3 is a functional block diagram illustrating a firewall for enforcing a policy for sinkholed network domains in accordance with some embodiments.

FIG. 3 is a functional block diagram illustrating a firewall for enforcing a policy for sinkholed network domains in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line) monitoring techniques. In one embodiment, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In one embodiment, network traffic is monitored using a state-based firewall. In particular, the state-based firewall can monitor traffic flows using an APP-ID engine, shown as App Signature Check 308. For example, the monitored network traffic can include HTTP traffic, FTP traffic, DNS requests, unclassified application traffic (e.g, unknown application traffic), and/or other types of traffic (e.g., traffic using other types of known or unknown protocols).

Referring to FIG. 3, network traffic monitoring begins at 302. An IP address and port engine 304 determines an IP address and port number for a monitored traffic flow (e.g., a session) based on packet analysis. A policy check engine 306 determines whether any policies can be applied based on the IP address and port number. As is also shown in FIG. 3, an application signature check engine 308 identifies an application (e.g., using an APP-ID engine using various application signatures for identifying applications based on packet flow analysis). For example, APP-ID engine 308 can be configured to determine what type of traffic the session involves, such as HTTP traffic, FTP traffic, DNS requests, unknown traffic, and various other types of traffic, and such classified traffic can be directed to an appropriate decoder, such as decoders 312, 314, and 316, to decode the classified traffic for each monitored session's traffic flow. As discussed above, DNS signatures can be applied at APP-ID engine 308 using bad domains data store 318 (e.g., a table, list, or other data store of bad domains, which can be in the form of signatures, such as DNS signatures). For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, bad domains data store 318 can be implemented as part of the signature engine, which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt engine 310 (e.g., applying man in the middle techniques using a self-signed certificate). A known protocol decoder engine 312 decodes and analyzes traffic flows using known protocols (e.g., applying various signatures for the known protocol) and reports the monitored traffic analysis to a report and enforce policy engine 320. Identified traffic (no decoding required) engine 314 reports the identified traffic to the report and enforce policy engine 320. An unknown protocol decoder engine 316 decodes and analyzes traffic flows (e.g., applying various heuristics) and reports the monitored traffic analysis to the report and enforce policy engine 320. For example, triggered DNS signatures can be reported and enforced using report and enforce policy engine 320.

In one embodiment, DNS responses that include an NXDOMAIN are reported as candidate domain names for sinkholing using report and enforce policy engine 320. For example, DNS responses that include an NXDOMAIN can be reported to a cloud security service (e.g., cloud security service 120 of FIG. 1). The cloud security service can collect passive DNS data that includes NXDOMAIN responses, which includes the domain name that was queried that resulted in that NXDOMAIN response and the IP destination associated with that NXDOMAIN response to indicate the IP address associated with the host (e.g., client device or other host device) that initiated the query for the non-existent domain name. This embodiment and related examples are further described below, such as with respect to FIG. 8.

In some implementations, various other functional architectures and flows are provided to implement the policy enforcement using the various techniques for sinkholed network domains as described herein. For example, some of these functions can be implemented in software executed on a general processor and/or some of these functions can be implemented using hardware acceleration techniques for faster packet processing of network traffic.

Figure 4:
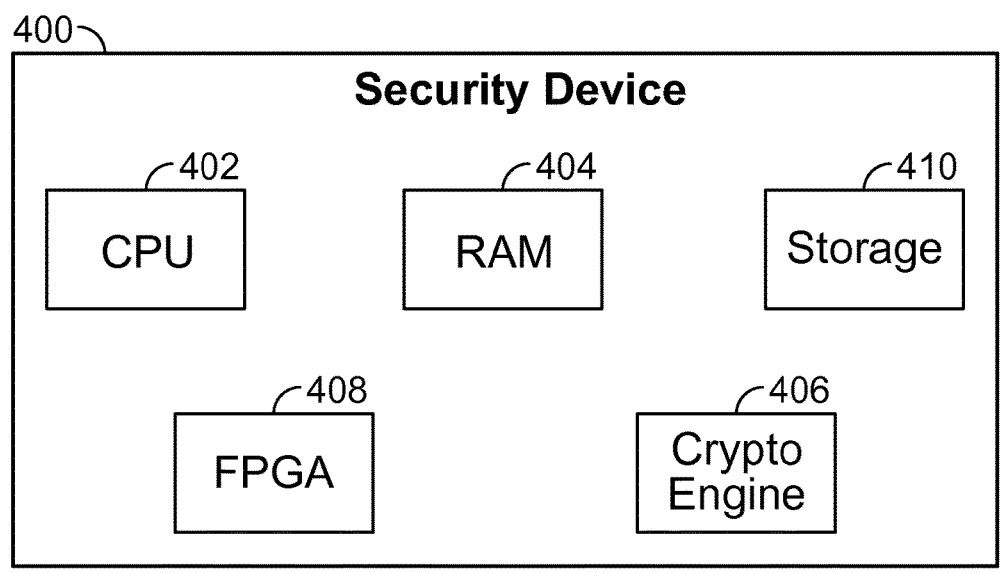
FIG. 4 is a functional diagram of hardware components of a security device for enforcing a policy for sinkholed network domains in accordance with some embodiments.

FIG. 4 is a functional diagram of hardware components of a security device for enforcing a policy for sinkholed network domains in accordance with some embodiments. The example shown is a representation of physical components that can be included in security device 400 (e.g., a data appliance, server, gateway, or other computing device). Specifically, security device 400 includes a high performance multi-core CPU 402 and RAM 404. Security device 400 also includes a storage 410 (e.g., one or more hard disks or solid state storage units), which is used to store policy and other configuration information as well as signatures (e.g., DNS signatures and/or other signatures that can be used by the security device, such as for firewall related functions). Security device 400 can also include one or more optional hardware accelerators. For example, security device 400 can include a cryptographic engine 406 configured to perform encryption and decryption operations, and one or more FPGAs 408 configured to perform signature matching, act as network processors, and/or perform other tasks.

Figure 5:
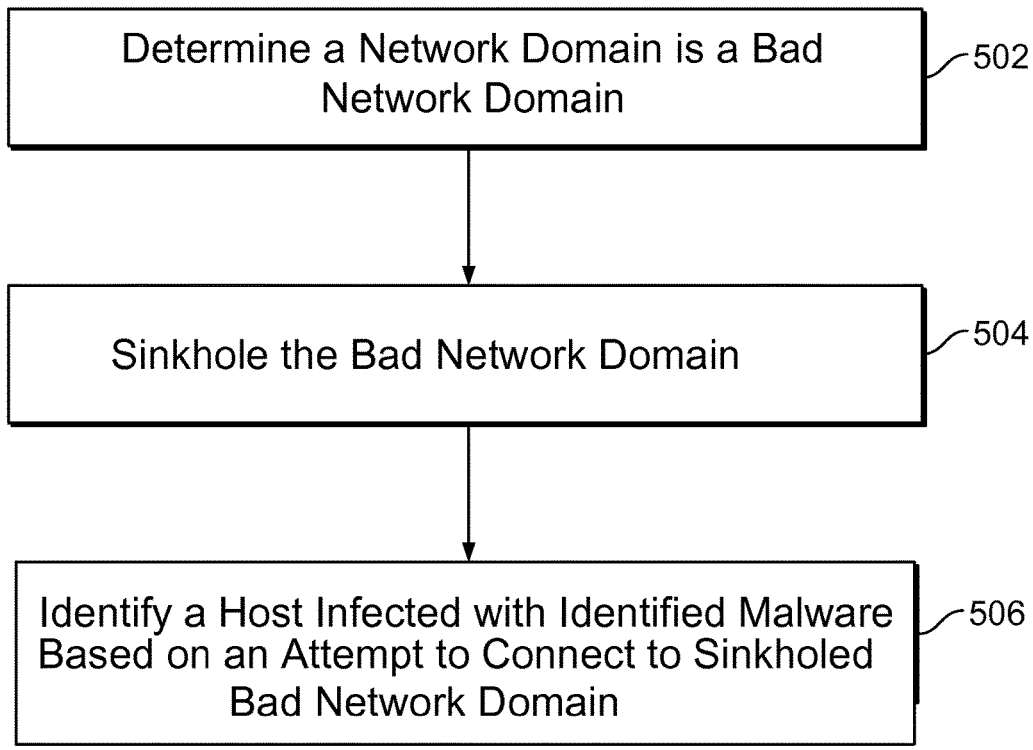
FIG. 5 is a flow diagram illustrating a process for discovering and selecting candidates for sinkholing of network domains in accordance with some embodiments.

FIG. 5 is a flow diagram illustrating a process for discovering and selecting candidates for sinkholing of network domains in accordance with some embodiments. At 502, determining a network domain is a bad network domain is performed. For example, the bad network domain can be determined to be associated with an identified malware (e.g., malware that has been identified and has been determined to be associated with the bad domain), and the bad network domain can be sinkholed by registering the bad network domain with a sinkholed IP address (e.g., a cloud security service can control the network resource, such as a server/appliance, associated with the sinkholed IP address). At 504, sinkholing the bad network domain is performed by registering the bad network domain on the Internet. For example, the bad network domain can be sinkholed by a cloud security service provider by registering the bad network domain with a sinkholed IP address (e.g., which can be associated with a network resource, such as a server/appliance, controlled by the cloud security service provider). At 506, identifying a host that is infected with the identified malware is performed based on an attempt by the host to connect to the sinkholed bad network domain (e.g., based on logged host attempts to connect to the network resource associated with the sinkholed IP address).

Figure 6:
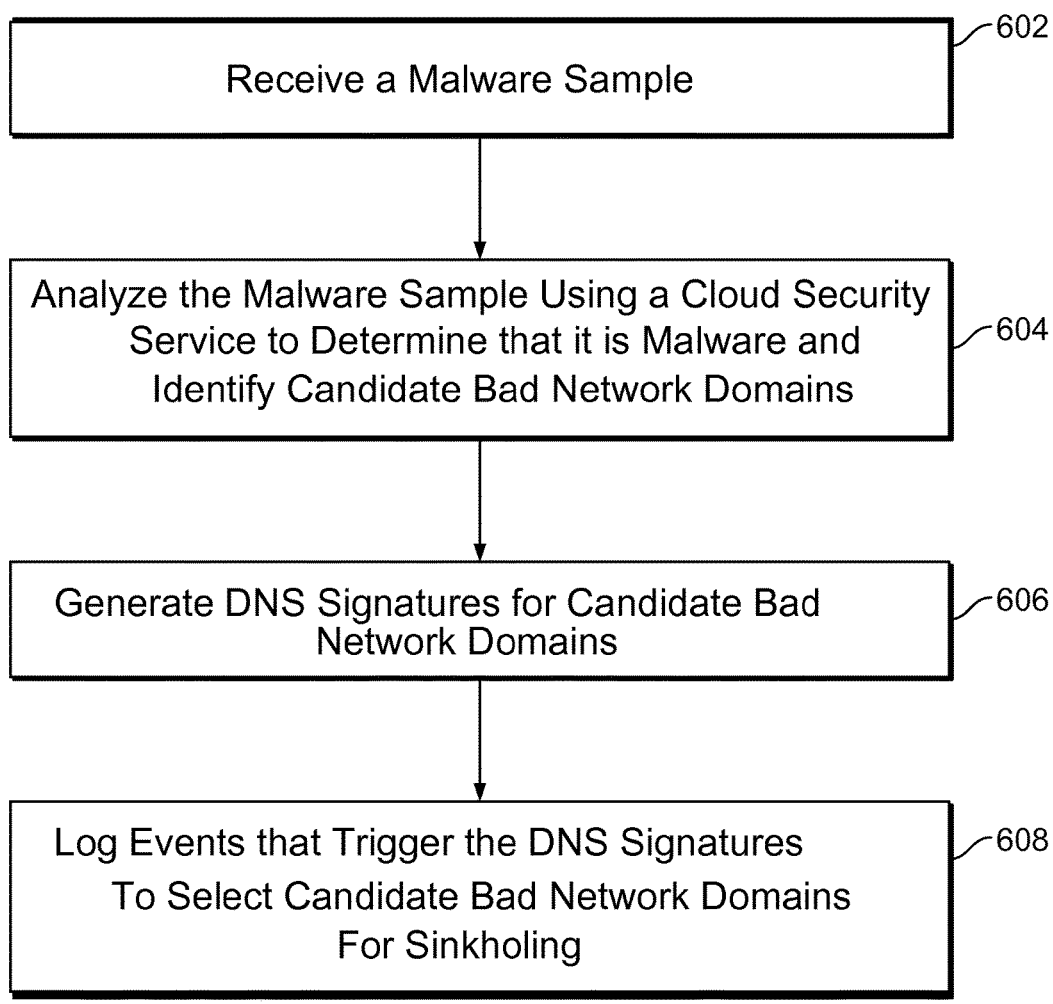
FIG. 6 is another flow diagram illustrating a process for discovering and selecting candidates for sinkholing of network domains in accordance with some embodiments.

FIG. 6 is another flow diagram illustrating a process for discovering and selecting candidates for sinkholing of network domains in accordance with some embodiments. At 602, a malware sample is received. For example, a cloud security service can receive malware samples from security devices (e.g., firewalls) of one or more customers. At 604, the malware sample is automatically analyzed using a cloud security service to determine that the malware sample is malware (e.g., to identify the malware as identified malware) and to identify candidate bad network domains. For example, network activity can be monitored during emulation of the malware sample to identify which bad network domains the identified malware attempts to connect to during the emulation, such as described above with respect to various embodiments. At 606, DNS signatures are generated for each of the candidate bad network domains. For example, these DNS signatures can be published (e.g., automatically distributed) by the cloud security service to firewalls of customers of the cloud security service. At 608, events that trigger one or more of the DNS signatures are logged. Based on analysis of these logged events, a subset of candidate bad network domains can be selected for sinkholing (e.g., to register if such are NXDOMAINs or to attempt to register to an IP address controlled by the cloud security service if, for example, a particular bad network domain is already registered by an entity associated with the identified malware, such as the malware author). For example, the cloud security service can periodically receive log data from firewalls of one or more customers that includes logged events of DNS signatures for candidate bad network domain(s) being triggered by one or more host attempts to access such candidate bad network domain(s).

Figure 7:
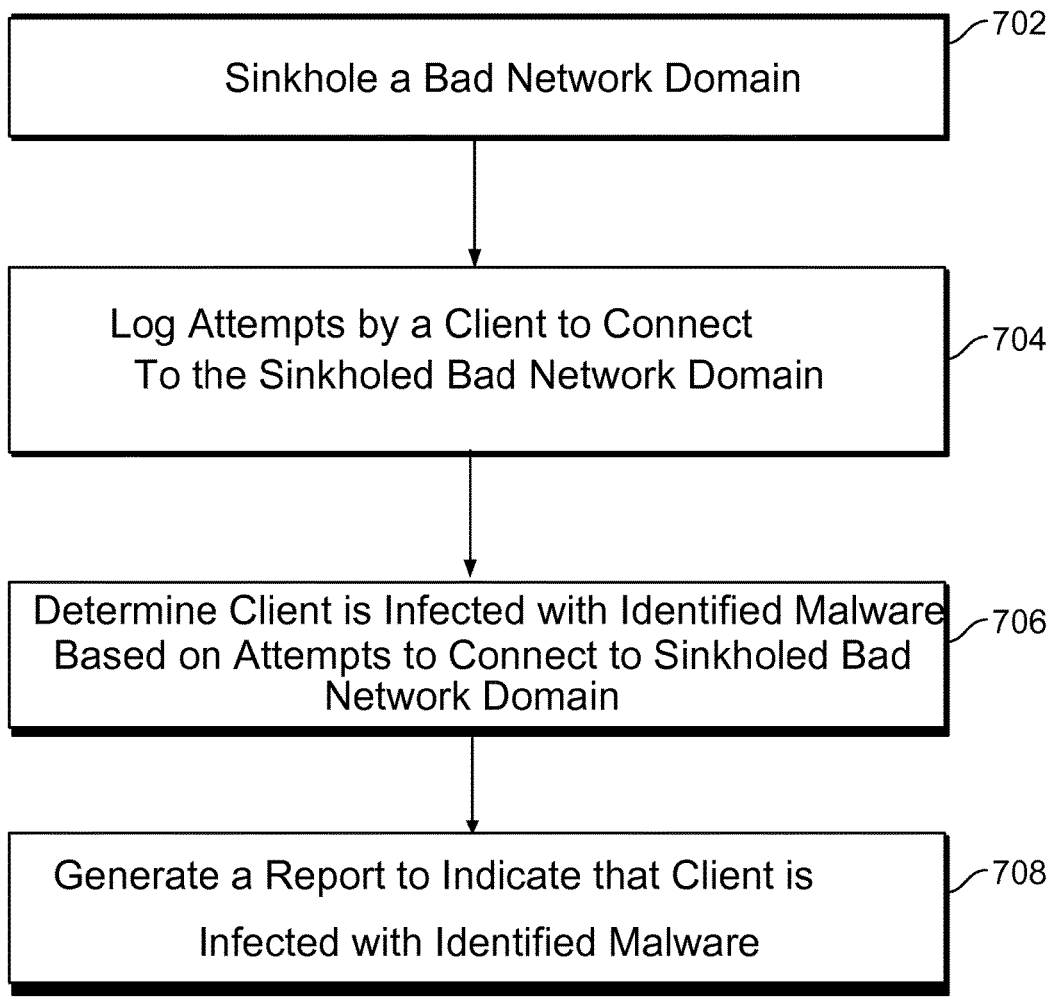
FIG. 7 is another flow diagram illustrating a process for discovering and selecting candidates for sinkholing of network domains in accordance with some embodiments.

FIG. 7 is another flow diagram illustrating a process for discovering and selecting candidates for sinkholing of network domains in accordance with some embodiments. At 702, a bad network domain is sinkholed. For example, a cloud security service provider can register the bad network domain to an IP address controlled by the cloud security service provider. At 704, attempts by a client (e.g., a client device or another type of host) to connect to the sinkholed bad network domain are logged (e.g., by the cloud security service, which controls a network resource that is configured with the IP address associated with the sinkholed bad network domain). At 706, that the client is infected with identified malware is determined based on the logged attempts by the client to connect to the sinkholed bad network domain. For example, network analysis of the identified malware can be used to uniquely associate the identified malware with the bad network domain, such as using various techniques described above. At 708, a report is automatically generated to indicate that the client is infected with identified malware based on the logged attempt by the client to connect to the sinkholed bad network domain.

Figure 8:
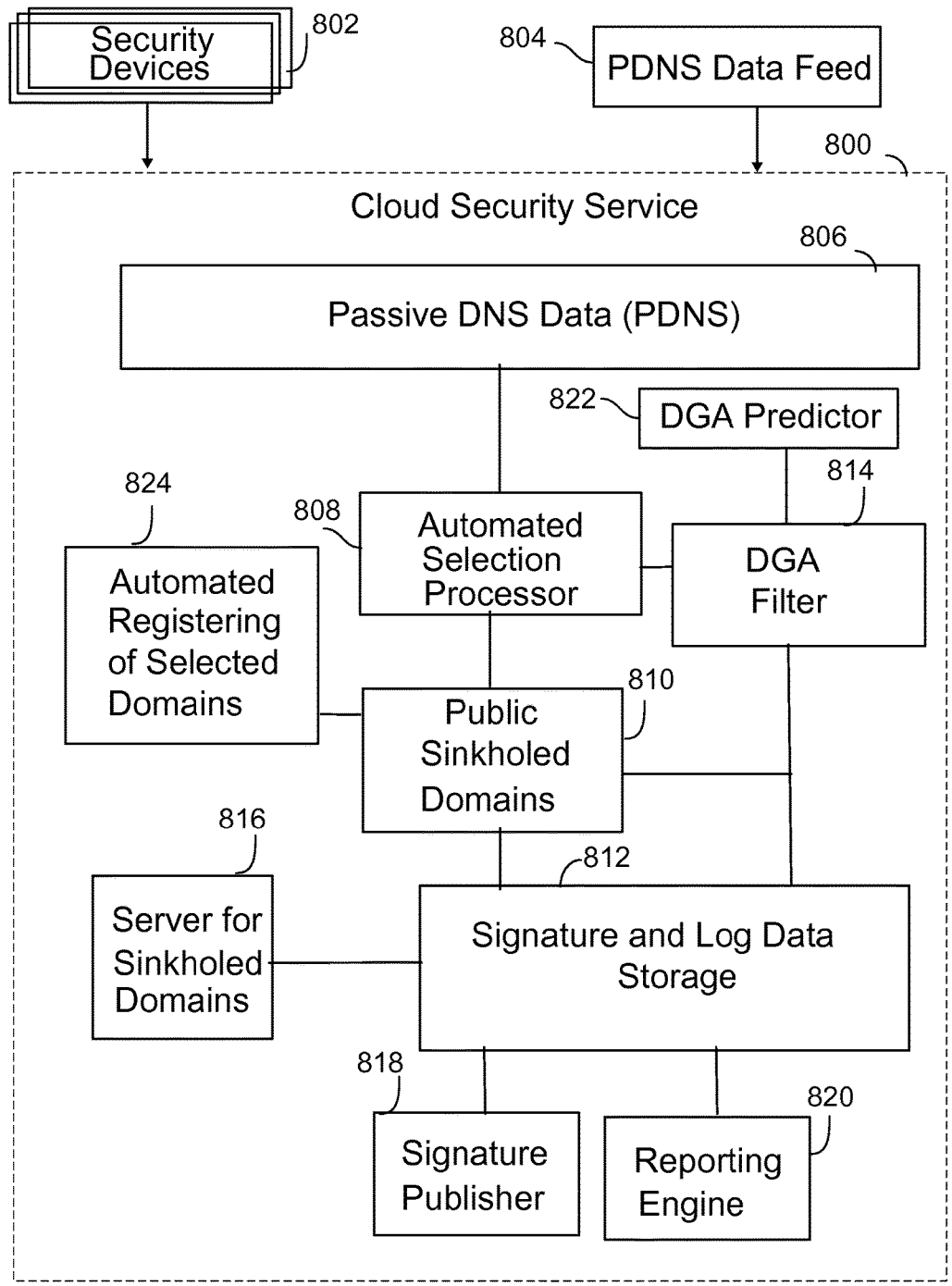
FIG. 8 is another functional block diagram illustrating a cloud security service for discovering and selecting candidates for sinkholing of network domains in accordance with some embodiments.

FIG. 8 is another functional block diagram illustrating a cloud security service for discovering and selecting candidates for sinkholing of network domains in accordance with some embodiments. In particular, cloud security service 800 is in communication with the Internet. For example, cloud security service 120 of FIG. 1 can be implemented as cloud security service 800 as shown in FIG. 8. As another example, cloud security service 200 of FIG. 2 can be implemented to also include components that are included in cloud security service 800 as shown in FIG. 8.

In one embodiment, techniques for an automated analysis of passive DNS data can be performed for discovering and selecting candidates for sinkholing of network domains in accordance with some embodiments. For example, the disclosed techniques can be performed to determine which of the candidate network domains should be registered for sinkholing. Accordingly, this approach allows cloud security service 800 to discover and select a subset of the candidate network domains to register for sinkholing, such as further described below.

As shown, cloud security service 800 can collect Passive DNS (PDNS) data. In some cases, the cloud security service can collect a large number (e.g., tens of thousands) of malware domains on a daily basis (e.g., as security devices/firewalls distributed at various enterprise customer networks can detect and report detected malicious/malware domains to the cloud security service, such as similarly described above). As a result, the large number (e.g., tens of thousands) of malware domains collected on a daily basis results in the technical problem of how to discover and select the network domains for sinkholing. This is especially challenging for public sinkholing, because public sinkholing requires registering the network domain on the Internet. One approach is to perform a manual analysis by a security researcher of one or more malware samples to identify malware domains. However, such approaches are typically time-consuming and not particularly effective. As discussed above, a more efficient and automated approach is to select network domains for sinkholing based on whether the network domains are determined to be associated with malware (e.g., based on analysis of one or more malware samples, such as using network analysis engine 206 of malware sample analysis engine 204 as shown in FIG. 2 and described above).

Another more efficient and automated approach will now be described with respect to FIG. 8, which can facilitate discovering and selecting good/desirable candidates for sinkholing of NX domains (e.g., public sinkholing of NX domains) by automatically determining which are commonly queried NX domains and, for example, that are being queried by a threshold number of distinct hosts over a threshold period of time, such as further described below. As similarly described herein, sinkholing of good/desirable candidate network domains can facilitate identification of additional malware domains/IPs, facilitate detection of additional/new malware samples, and/or facilitate detection of additional/new infected hosts, as also further described below.

In one embodiment, cloud security service 800 collects Passive DNS (PDNS) data and identifies candidate network domains for sinkholing that are associated with a significant number of distinct hosts (e.g., a threshold number of distinct infected host devices, such as client devices). The cloud security service can also perform the analysis of candidate network domains over a period of time to select candidate network domains for sinkholing that are associated with a significant number of distinct hosts over a threshold period of time (e.g., two to three days or some other threshold period of time). For example, by discovering and selecting such candidate network domains for public sinkhole domains, the cloud security service can observe more infected hosts from a variety of enterprise networks (e.g., subscribing customer enterprise networks in a variety of geographical locations, across the world). Such an enhanced collection of public sinkhole domains can facilitate in detecting additional malware domains/IPs and/or to detect previously undetected malware samples (e.g., which can be used to detect new malware signatures for distribution to subscribing security devices/firewalls, etc.).

In one embodiment, cloud security service 800 collects Passive DNS (PDNS) data to implement PDNS-based sinkhole candidates discovery as will now be described with respect to FIG. 8. As shown, cloud security service 800 collects PDNS data from a plurality of security devices 802. For example, the security devices can include security devices such as similarly described above that subscribe to the cloud security service, and the PDNS data from the security devices can be periodically sent to the cloud security service (e.g., using a push and/or pull protocol). As shown, cloud security service 800 also receives a PDNS data feed from a PDNS data feed 804. For example, the PDNS data feed can include a third party source of PDNS data (e.g., provided by SIE/Farsight Security or another third party PDNS data source, using a push and/or pull protocol).

In one embodiment, cloud security service 800 periodically collects/receives the PDNS data from security devices 802 and PDNS data feed 804 for storing in Passive DNS Data (PDNS) data store 806. The PDNS data stored in PDNS data store 806 is processed using an automated selection processor 808 to perform the disclosed techniques for discovering and selecting candidates for sinkholing of network domains in accordance with some embodiments.

In an example implementation, the PDNS data is stored in a cluster (e.g., implemented using Apache Hadoop/MapReduce, Cloudera Hadoop (HDFS)/MapReduce, or some other open source or commercially available solution, which can be executed on server class hardware in a data center or using a data center services provider such as Amazon Web Services, IBM, or another data center services provider), and the PDNS data is processed (e.g., periodically/on demand) using a job to perform the automated selection processing (e.g., selecting, ranking, and filtering operations, such as further described below) of candidates for sinkholing of network domains (e.g., implemented using a MapReduce program/job such as using Apache MapReduce framework/libraries of Apache Hadoop/MapReduce, Cloudera Hadoop (HDFS)/MapReduce, or some other open source or commercially available solution, which can be executed daily or at some other periodic interval or upon demand, which can be executed on server class hardware in a data center or using a data center services provider such as Amazon Web Services, IBM, or another data center services provider). In this example implementation, the job can be performed periodically (e.g., daily or at some other periodic interval or upon demand) to filter and rank the NX domains using the disclosed techniques.

In one embodiment, discovering and selecting candidates for sinkholing of network domains as implemented by automated selection processor 808 includes selecting DNS records for NX domains and then ranking the NX domains (e.g., PDNS data includes a plurality of NX domains received/collected from security devices 802 and/or PDNS data feed 804 as described above) using the disclosed techniques. For example, automated selection processor 808 can rank the network domains based on a number of DNS queries for domains in NX records from different/distinct hosts (e.g., based on destination IP addresses in the DNS responses in the NX records stored in PDNS data). The result of such a ranking is a ranked list of popular NX domains that are most commonly queried from different/distinct hosts (e.g., the ranked list of popular NX domains can be generated and stored in a flat file for each day's job processing of PDNS data, or such can be stored in another form of data stores, such as using a relational and/or object-based database). The ranking of popular NX domains can be based on NX records from different/distinct hosts to discover and identify NX domains that are being most commonly queried across different hosts, which can facilitate discovery and identification of better candidates for sinkholing (e.g., additional filtering operations can also be performed, such as to filter out DGA-generated domains, to require a threshold number of distinct hosts associated with candidate NX domains, and/or requiring that NX domains be commonly queried over a threshold number of days/period of time, such as further described below).

However, one or more of the NX domains in the sorted/ranked listing of popular NX domains may not be good sinkhole candidates for various different reasons. For example, the popularity of some NX domains may only last for one or two days. This makes such short-lived popularity of certain NX domains to be undesirable candidates for sinkholing, because by the time such NX domains could be registered (e.g., registering a new domain typically takes about one day), such domains are no longer popular as they are not being commonly queried by malware (e.g., C&C malware or other malware). As such, attempting to register such short-lived popular NX domains is not an efficient use of resources to register NX domains for public sinkholing. Meanwhile, waiting too long to register popular NX domains for public sinkholing also poses the risk that if the popularity is maintained (e.g., stabilizes or grows) over several consecutive days, then others may attempt to register the NX domains (e.g., malware author/attacker or other security vendors, etc.).

An example listing of a subset of NX domains included in a popular NX domains listing using the above-described techniques is shown below.

torrent-download.to 133007 torrent-download.to
retracker.local 52567 retracker.local
uafortsmith.edu 14692 uafortsmith.edu
restlesz.su 11089 restlesz.su
devicesta.ru 10897 devicesta.ru
Iixnekheic.kz 5332 Iixnekheic.kz
hufubuzonad.kz 5306 hufubuzonad.kz
woqcarurke.kz 5107 woqcarurke.kz
hudeihijeoqu.kz 4480 hudeihijeoqu.kz
ladbajuje.kz 4286 ladbajuje.kz
qemurpecvoq.kz 4259 qemurpecvoq.kz
myiskosuiikykagi.org 3857 myiskosuiikykagi.org
kalbizozuf.kz 3937 kalbizozuf.kz
seklixxifa.kz 3926 seklixxifa.kz
aacaeqieqoaiykws.org 3739 aacaeqieqoaiykws.org
skaakuomwgacoqyg.org 3693 skaakuomwgacoqyg.org
ywoekqumwmygouka.org 3678 ywoekqumwmygouka.org
iqswksmkegumawkm.org 3623 iqswksmkegumawkm.org
skqgakcyowmwcomc.org 3618 skqgakcyowmwcomc.org
e7j0ht.cn 3694 e7j0ht.cn
skmggwaiuwuywgwy.org 3594 skmggwaiuwuywgwy.org Accordingly, in one embodiment, in order to discover and identify better candidates for sinkholing, the sorted/ranked listing of popular NX domains is performed daily over a period of time, such as over consecutive days (e.g., PDNS data can be collected and processed daily). For example, if a particular NX domain, such as foo.com, is a popular NX domain in the PDNS data on days 1, 2, and 3 (e.g., the foo.com NX domain appeared in a top 10, top 100, or some other threshold ranking in the sorted/ranked listing of popular NX domains for each of days 1, 2, 3), then that particular NX domain can be selected by automated selection processor 808 as a potential candidate for sinkholing as further described below. As a result, this approach can avoid identifying candidates for sinkholing that are only popular on, for example, day 1 or days 1 and 2. This approach also can avoid waiting too long prior to identifying candidates for sinkholing by, for example, selecting candidates for sinkholing after such are popular for a threshold number of days (e.g., based on satisfying a threshold ranking in a popular NX domains listing determined each day and over a consecutive number of days).

As another example of when one or more of the NX domains (NX domain names) in the sorted/ranked listing of popular NX domains may not be good sinkhole candidates, some popular NX domains may not be associated with C&C malware (e.g., are not currently being used for C&C malware related activities, such as not being used over an extended period of time, such as more than just a day or two). As such, an additional filtering operation can be performed using a DGA-domain prediction to filter out time-sensitive DGA domains (DGA-generated domain names) from the ranked listing of popular NX domains, because such NX domains would typically only be used for at most one day by such C&C malware. For example, a DGA predictor can generate DGA-generated domains using malware samples executed in a virtual machine (VM) environment (e.g., an instrumented VM environment to monitor performance of the malware sample(s) in an emulation environment that can trigger behaviors of the malware sample(s) to generate domains and query such DGA domains, such as similarly described above with respect to the cloud security service as shown in FIG. 2 showing a malware sample analysis 204 and network analysis engine 206, which can be configured to capture and log such DGA-generated domains to add to a DGA filter as shown in FIG. 8 and further described herein).

In one embodiment, the DGA filter is also applied to exclude similar DGA generated names (e.g., foo1.com, foo2.com, foo3.com, etc.) based on similarity techniques. For example, a Levenshtein distance of pairwise similarity can be calculated based on the threshold value and/or using other similarity techniques (e.g., such similarity/distance analysis techniques can be applied to DGA generated names based on concurrence in time and co-located/based on DNS response destination (dest) IP addresses, which is the IP associated with the device submitting a DNS query for the NX domain).

Accordingly, in one embodiment, in order to discover and identify better candidates for sinkholing, DGA domains can be filtered out of the sorted/ranked listing of popular NX domains. Referring to FIG. 8, a DGA predictor 822 generates one or more DGA domains that can be used by a DGA filter 814 to filter any such DGA domains out of the sorted/ranked listing of popular NX domains generated by automated selection processor 808. For example, the DGA filter can be applied to the listing of popular NX domains to exclude DGA generated names, and in some cases to also exclude similar DGA generated names (e.g., foo1.com, foo2.com, foo3.com, etc.) based on similarity techniques, such as discussed above.

However, the above-described DGA domains prediction may not cover all the time-sensitive DGA-generated domain names. In one embodiment, to further filter out DGA domains that may not be desirable candidates for sinkholing, automated selection processor 808 also filters the ranked listing of popular NX domains by determining the DNS inquiry patterns that are shared by multiple (e.g., >n number of distinct hosts) popular NX domains. For example, processing by the automated selection processor (808) can also include filtering the ranked listing of popular NX domains to filter out NX domains that are not queried (e.g., during that period of time captured by the PDNS data) by at least a threshold number of distinct hosts (e.g., such as at least 10, 100, or some other threshold number of distinct hosts, in which distinct hosts can be identified based on unique IP addresses, such as similarly described above). Because DGA domains are generated and queried in batch, whereas hard-coded C&C domains are not, such shared patterns across a group of NX domains generally suggest that the group of domains are DGA domains.

In one embodiment, the various disclosed techniques for discovering and selecting candidates for sinkholing of network domains uses the PDNS data feed, DGA domain-prediction, and DGA domain DNS patterns to discover and automatically select good/desirable candidates for sinkholing (e.g., identifying the best/most desirable candidates for public sinkholing for the various reasons described above). In an example implementation, the list of popular NX domains from distinct hosts can be generated and then the further analysis of the list of popular NX domains can be performed on a subset of that top n number of domains on that list (e.g., further processing based on DGA domain-prediction by applying the DGA filter and DGA domain DNS patterns, as discussed above, can be performed on the top 300, 500, 1000, or some other top number of popular NX domains from the daily generated listing of popular NX domains). Performing the additional analysis and processing operations on a subset of the popular NX domains listing can facilitate more efficient processing of the popular NX domains for discovering and selecting candidates for sinkholing of network domains using the PDNS data feed, DGA domain-prediction, and DGA domain DNS patterns to discover and automatically select good/desirable candidates for sinkholing (e.g., and without requiring the use of computer security analysts' manual analysis of potential candidates for sinkholing).

Referring to FIG. 8, the various disclosed techniques for discovering and selecting candidates for sinkholing of network domains is implemented by automated selection processor 808 and DGA filter 814 to automatically process PDNS data 806 to identify a ranked and filtered listing of popular NX domains. At 810, a threshold number of the top NX domains in the resulting ranked and filtered listing of popular NX domains can be automatically selected for public sinkholing (e.g., a top 5, top 10, or some other number of NX domains). For example, the top candidate NX domains can also be verified to not have been previously selected for registering for public sinkholing (e.g., in some cases, such a candidate NX domain may have been selected in the prior processing, one day earlier, but not yet registered, so that NX domain may still be appearing in the PDNS data). At 824, the automatically selected NX domains for sinkholing can be registered with a Domain Name Registrar for the Internet (e.g., automated registering of selected domains can be implemented as a script to automatically submit domain name registrations to the Domain Name Registrar for each of the automatically selected NX domains for sinkholing). Accordingly, the disclosed techniques performed by cloud security service 800 facilitate automated and systematic techniques for efficiently and effectively discovering and selecting good/desirable candidates for sinkholing of network domains.

Referring to FIG. 8, signatures are stored in signature and log data storage 812, such as similarly described above with respect to signature and log data storage 212 of FIG. 2 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 800 using signature publisher 818. For example, if during emulation analysis of malware-Sample-X (e.g., including logging DNS traffic during an instrumented virtualized emulation of malware-Sample-X), that malware sample attempts to connect to malware-bad-site-1.com, malware-bad-site-2.com, and malware-bad-site-3.com, then signatures (e.g., DNS signatures) can be generated for each of those bad network domains (e.g., known malware domains, which can be used to block hosts from attempting to connect to such bad network domains as implemented by local security devices). These signatures can be sent to firewalls of multiple customers of cloud security service 800, which can then log and report back to cloud security service 800 any attempts that such customer firewalls identify as hosts attempting to connect to any of such known malware domains, which can also be stored in signature and log data storage 812.

As is also shown in FIG. 8, cloud security service 800 provides a server for sinkholed domains 816 (e.g., or multiple servers or appliances) that can be associated with one or more sinkholed IP addresses for the discovered and selected network domains using the above described techniques. Any attempts by hosts (e.g., clients 104, 106, or 108 as shown in FIG. 1, or other hosts, even if such are hosts that are not associated with customers of the cloud security service) can be determined using server for sinkholed domains 816 and logged to a signature and log data storage 812 (e.g., or in some implementations, stored in a separate data store). Cloud security service 800 can uniquely associate an identified malware sample with one or more bad network domains, such that host attempts to connect to such bad network domains (e.g., known malware domains) can be used to determine that such hosts are infected with the identified malware. Reporting engine 820 is configured to automatically report to customers (e.g., or others who may not be current customers) which host(s) are infected with identified malware based on logged attempts to connect to sinkholed IP addresses that are associated with bad network domains. Accordingly, this approach allows the cloud security service provider to use sinkholed domains to report which clients are infected with identified malware even for hosts that are not associated with a customer, as the cloud security service provider controls the IP addresses for the sinkholed domain such that traffic is directed to a network resource (e.g., server 816 as shown in FIG. 8) for monitoring, logging, and reporting which hosts attempt connections (e.g., client devices infected with malware-Sample-X that is sending C&C traffic to malware-bad-site-3.com) to such sinkholed bad domains.

An example of DGA domains shown as a cluster which were identified using the above-described techniques is shown below.
aacaeqieqoaiykws.org 3883
skaakuomwgacoqyg.org 3838
ywoekqumwmygouka.org 3825
iqswksmkegumawkm.org 3770
skqgakcyowmwcomc.org 3769

In one embodiment, the above-described techniques can be applied to identify hosts that are infected within a customer's network and/or to prevent future malware infections of hosts on the customer's network. As an example use case scenario of a public sinkhole, a domain that is actively being used by a C&C server may be part of a large botnet infrastructure (e.g., public sinkhole servers can receive thousands to millions (or greater) of numbers of attempts to connect from distinct hosts, that is a unique infected IP, to a sinkholed domain). As such, these techniques can allow the cloud security service to identify various different infected hosts in customer networks (e.g., and/or outside of customer networks, as such is a public sinkhole). As another example use case scenario of a public sinkhole, a signature (e.g., a firewall signature implemented on a security device, such as described above) can be generated to block sinkhole IP addresses (sinkhole IPs) to prevent future attacks. As a result, by blocking sinkhole IPs, malware (e.g., malicious files) can be prevented from entering a customer's network (e.g., customers of the cloud security service) without the (prior) knowledge of the file or the attack.

Figure 9:
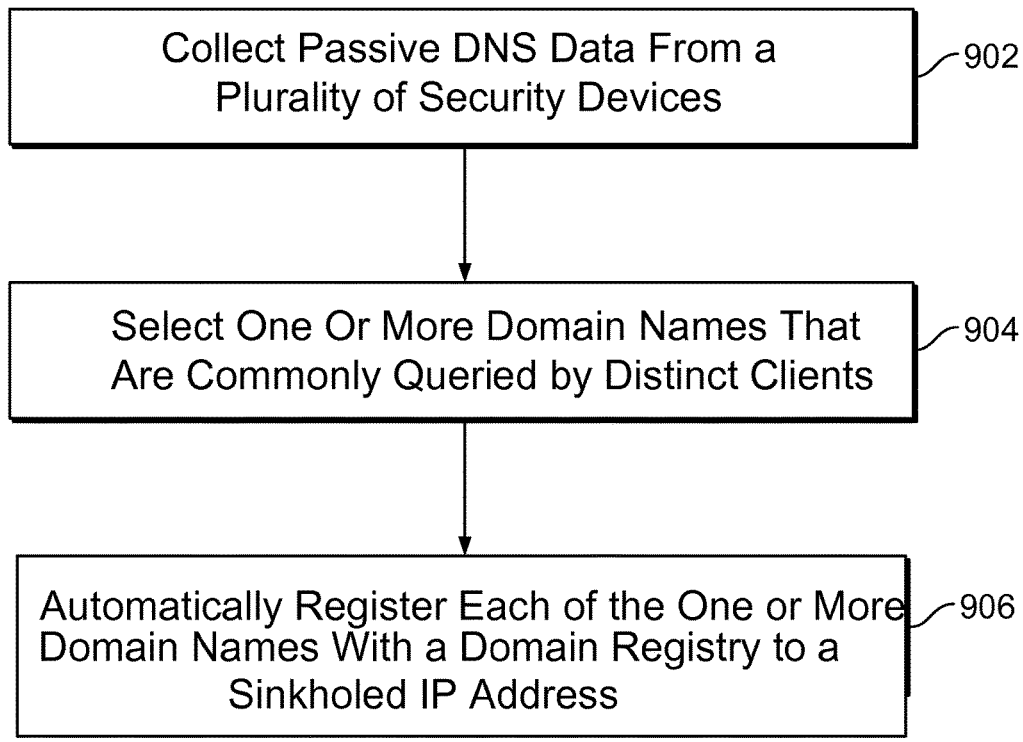
FIG. 9 is another flow diagram illustrating a process for discovering and selecting candidates for sinkholing of network domains in accordance with some embodiments.

FIG. 9 is another flow diagram illustrating a process for discovering and selecting candidates for sinkholing of network domains in accordance with some embodiments. In one embodiment, the process as shown in FIG. 9 can be performed using the cloud security service as shown in FIGS. 1, 2, and/or 8, such as similarly described above.

At 902, collecting passive DNS data from a plurality of security devices to discover candidates for sinkholing of domain names is performed. For example, the passive DNS data (e.g., PDNS data) can be collected from security devices that are subscribers to a cloud security service, such as similarly described above with respect to FIG. 8. As another example, PDNS data can also be received from a PDNS data feed (e.g., from a third party source of PDNS data), such as similarly described above with respect to FIG. 8.

At 904, selecting one or more domain names that are most commonly queried by distinct client devices based on the passive DNS data is performed. For example, each of the one or more domain names is not yet registered (i.e., such are NX domains and, thus, may be good candidates for public sinkholing, such as if they are popular NX domains being queried by significant numbers of distinct hosts over a period of time).

At 906, automatically registering each of the one or more domain names with a domain registry to a sinkholed IP address in order to sinkhole each of the one or more domain names is performed. For example, the cloud security service can control the network resource, such as a server/appliance, associated with the sinkholed IP address (e.g., which facilitates additional security analysis that can be performed by the cloud security service using the sinkholed domain, such as similarly described above). As an example, the cloud security service can identify a host that is infected with the identified malware based on an attempt by the host to connect to the sinkholed domain (e.g., based on logged host attempts to connect to the network resource associated with the sinkholed IP address), such as similarly described above with respect to FIG. 8.

Figure 10:
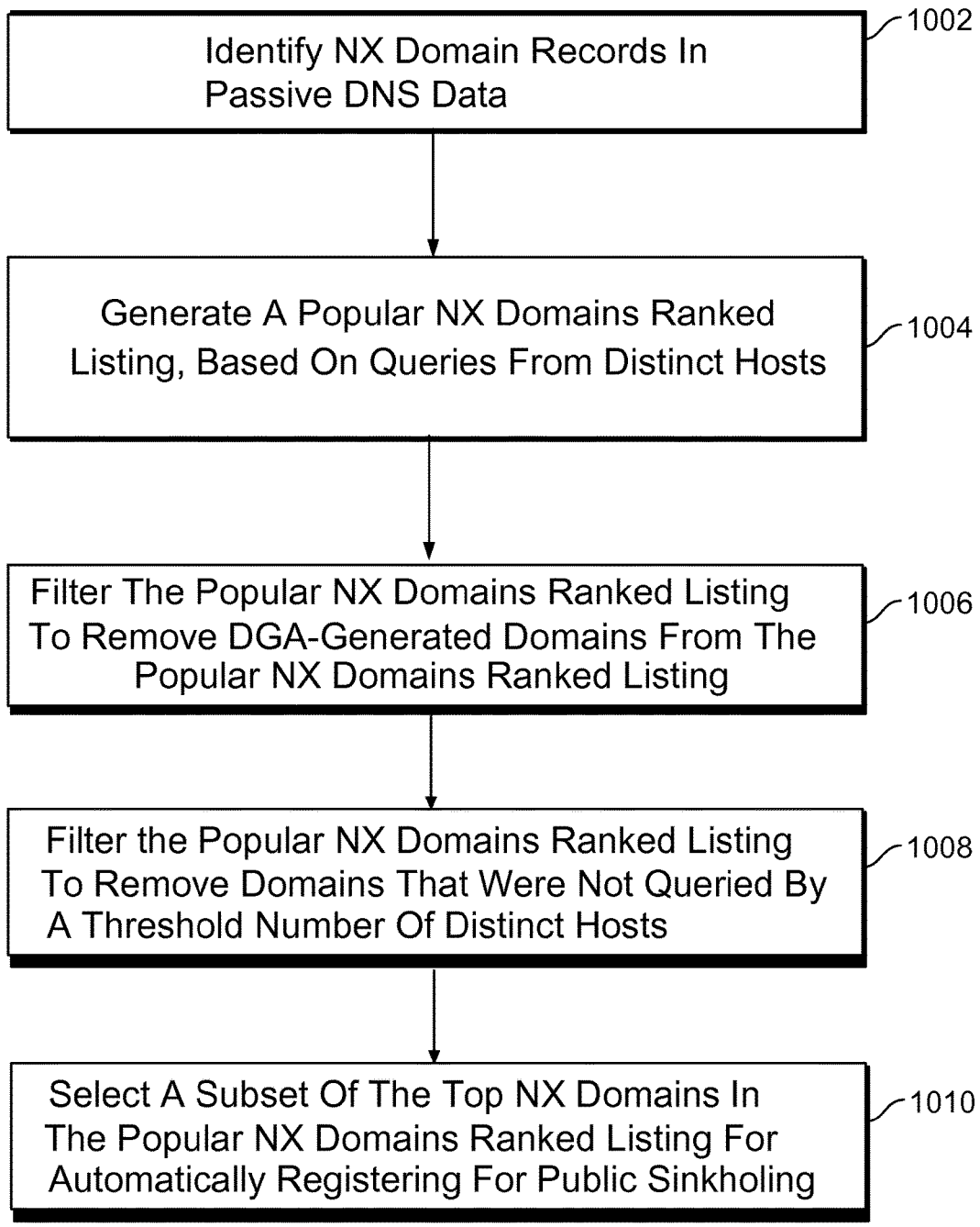
FIG. 10 is another flow diagram illustrating a process for discovering and selecting candidates for sinkholing of network domains in accordance with some embodiments.

FIG. 10 is another flow diagram illustrating a process for discovering and selecting candidates for sinkholing of network domains in accordance with some embodiments. In one embodiment, the process as shown in FIG. 10 can be performed using the cloud security service as shown in FIGS. 1, 2, and/or 8, such as similarly described above.

At 1002, NX domain records in passive DNS data are identified. For example, passive DNS data (e.g., PDNS data) can be received/collected from a set of security devices and/or a PDNS data feed, such as similarly described above with respect to FIG. 8.

At 1004, a popular NX domains ranked listing is generated based on a number of queries from distinct hosts. For example, a number of queries from distinct hosts to an NX domain can be determined based on an IP address associated with a DNS response to the DNS query for the NX domain, such as similarly described above with respect to FIG. 8.

At 1006, the popular NX domains ranked listing can be filtered to remove DGA-generated domains from the popular NX domains ranked listing. For example, a DGA filter can be applied (e.g., to all or a subset of the top n number of ranked NX domains in the popular NX domains ranked listing) to remove DGA-generated domains (e.g., and/or domain names that are similar to such DGA-generated names) from the popular NX domains ranked listing, such as similarly described above with respect to FIG. 8.

At 1008, the popular NX domains ranked listing can also be filtered to remove domains from the popular NX domains ranked listing that were not queried by a threshold number of distinct hosts. For example, requiring that the NX domains in the popular NX domains ranked listing have been queried by at least n number of distinct hosts (e.g., 10, 100, or some other number of distinct hosts) can be performed as a mechanism for using DGA domain DNS patterns to discover and automatically select good/desirable candidates for sinkholing, such as similarly described above with respect to FIG. 8.

At 1010, a subset of the top NX domains in the popular NX domains ranked listing can be selected for automatically registering for public sinkholing. For example, a top n number (e.g., top 5, 10, or some other number) of the highest ranked popular NX domains that are still on the popular NX domains ranked listing after the above-described selecting, ranking, and filtering operations can be automatically selected and registered with a Domain Name Registrar on the Internet for public sinkholing of the network domains, such as similarly described above with respect to FIG. 8.

Figure 11:
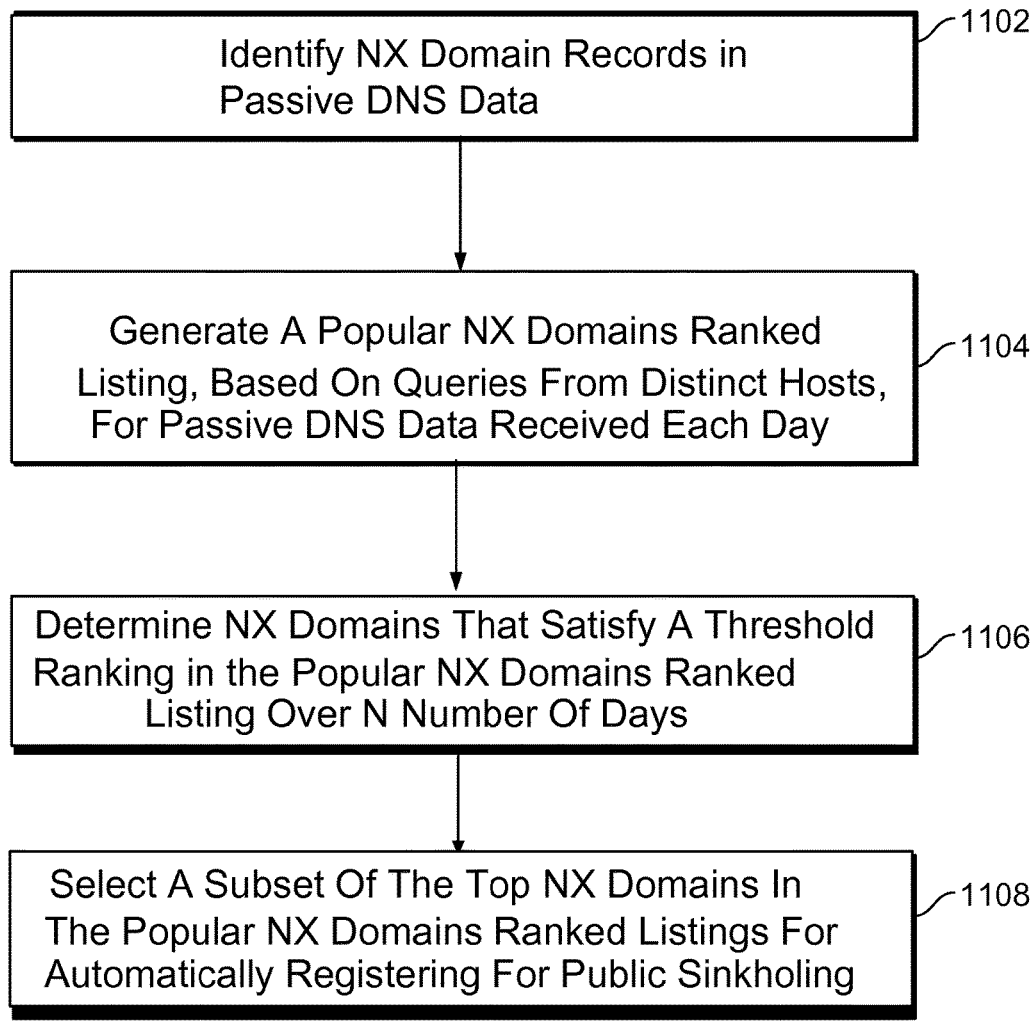
FIG. 11 is another flow diagram illustrating a process for discovering and selecting candidates for sinkholing of network domains in accordance with some embodiments.

FIG. 11 is another flow diagram illustrating a process for discovering and selecting candidates for sinkholing of network domains in accordance with some embodiments. In one embodiment, the process as shown in FIG. 11 can be performed using the cloud security service as shown in FIGS. 1, 2, and/or 8, such as similarly described above.

At 1102, NX domain records in passive DNS data are identified. For example, passive DNS data (e.g., PDNS data) can be received/collected from a set of security devices and/or a PDNS data feed, such as similarly described above with respect to FIG. 8.

At 1104, a popular NX domains ranked listing is generated based on a number of queries from distinct hosts, for passive DNS data received each day. For example, a number of queries from distinct hosts to an NX domain can be determined based on an IP address associated with a DNS response to the DNS query for the NX domain, such as similarly described above with respect to FIG. 8. This operation (e.g., implemented as a MapReduce job for efficiently processing the significant amount of PDNS data) can be performed daily on the daily set of PDNS data, such as similarly described above with respect to FIG. 8.

At 1106, the NX domains that satisfy a threshold ranking (e.g., top 10, 100, or some other number) in the popular NX domains ranked listing over a period of n number of days (e.g., top ranked NX domains over a period of two days, three days, or some other threshold number of days/period of time) are determined. For example, NX domains that are commonly queried (e.g., by distinct hosts) over a period of time, such as two to three days (e.g., or some other threshold number of days/period of time), as indicated on each of the respective popular NX domains ranked listings for each day, can be identified as good/desirable candidates for sinkholing, such as similarly described above with respect to FIG. 8.

At 1108, a subset of the top NX domains in the popular NX domains ranked listing can be selected for automatically registering for public sinkholing. For example, a top n number (e.g., top 5, 10, or some other number) of the highest ranked popular NX domains that satisfy the threshold ranking on the popular NX domains ranked listing over a threshold number of n days (e.g., two to three days or some other threshold period of time) can be automatically selected and registered with a Domain Name Registrar on the Internet for public sinkholing of the network domains, such as similarly described above with respect to FIG. 8.

In one embodiment, various combinations of the processes as shown in FIGS. 5, 6, 7, 9, 10, and/or 11 can be performed using the cloud security service as shown in FIGS. 1, 2, and/or 8, such as similarly described above, as would now be apparent to one of ordinary skill in the art.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for discovering and selecting candidates for sinkholing of network domains, comprising:
 a hardware processor configured to:
  collect passive DNS data from a plurality of security devices to discover candidates for sinkholing of domain names;
  select one or more domain names that are most commonly queried by distinct client devices based on the passive DNS data, wherein each of the one or more domain names is not yet registered, wherein the selecting of the one or more domain names that are most commonly queried comprises to:
   rank commonly queried domain names based on number of queries by the distinct client devices; and
   select N most commonly queried domain names to obtain the one or more domain names, N being an integer greater than zero;
  apply a Domain Generation Algorithm (DGA) filter to remove any DGA generated domain names from the candidates for sinkholing of domain names, wherein the DGA filter includes a plurality of DGA generated domain names based on an emulated analysis of malware, wherein the applying of the DGA filter comprises to:
   determine whether a domain name of the one or more domain names has not been queried by at least a threshold number of distinct hosts, the distinct hosts corresponding to unique IP addresses; and
   in the event that the domain name of the one or more domain names has not been queried by at least the threshold number of distinct hosts, remove the domain name from the one or more domain names; and
  automatically register each of the one or more domain names with a domain registry to a sinkholed IP address in order to sinkhole each of the one or more domain names; and
 a memory coupled to the hardware processor and configured to provide the hardware processor with instructions.

2. The system recited in claim 1, wherein the passive DNS data from the plurality of security devices includes DNS responses to DNS queries for non-existent domains (NXDOMAINs), and wherein each of the DNS responses includes a destination IP address that corresponds to a client device requesting a domain name resulting in an NXDOMAIN DNS response.

3. The system recited in claim 1, wherein the passive DNS data from the plurality of security devices includes DNS responses to DNS queries for non-existent domains (NXDOMAINs), wherein each of the DNS responses includes a destination IP address that corresponds to a client device requesting a domain name resulting in an NXDOMAIN DNS response, and wherein the distinct client devices are determined based on distinct IP addresses associated with DNS responses provided in the passive DNS data.

4. The system recited in claim 1, wherein the passive DNS data from the plurality of security devices is collected daily; and wherein the selected one or more domain names are the most commonly queried by distinct client devices based on the passive DNS data over a period of two or more consecutive days.

5. The system recited in claim 1, wherein the hardware processor is further configured to:

receive a plurality of malware samples; and execute each of the plurality of malware samples to identify a plurality of DGA generated domain names.

6. The system recited in claim 1, wherein the hardware processor is further configured to:

determine a first network domain of the one or more domain names is a bad network domain, wherein the bad network domain is determined to be associated with an identified malware, and wherein the bad network domain is sinkholed by registering the bad network domain with a first sinkholed IP address; and identify a host that is infected with the identified malware based on an attempt by the host to connect to the first sinkholed IP address.

7. The system recited in claim 1, wherein the hardware processor is further configured to:

receive additional passive DNS data from a third party DNS data source; and aggregate the additional passive DNS data from the third party DNS data source with the collected passive DNS data from the plurality of security devices for analysis for discovering and selecting candidates for sinkholing of network domains.

8. The system recited in claim 1, wherein the hardware processor is further configured to:

generate a log for each attempted host connection to the sinkholed IP address.

9. The system recited in claim 1, wherein the hardware processor is further configured to:

generate a log for each attempted host connection to the sinkholed IP address; and report a plurality of hosts that attempted to connect to the sinkholed IP address.

10. A method of discovering and selecting candidates for sinkholing of network domains, comprising:

collecting passive DNS data from a plurality of security devices to discover candidates for sinkholing of domain names;

selecting one or more domain names that are most commonly queried by distinct client devices based on the passive DNS data, wherein each of the one or more domain names is not yet registered, wherein the selecting of the one or more domain names that are most commonly queried comprises:

ranking commonly queried domain names based on number of queries by the distinct client devices; and selecting N most commonly queried domain names to obtain the one or more domain names, N being an integer greater than zero;

applying a Domain Generation Algorithm (DGA) filter to remove any DGA generated domain names from the candidates for sinkholing of domain names, wherein the DGA filter includes a plurality of DGA generated domain names based on an emulated analysis of malware, wherein the applying of the DGA filter comprises:

determining whether a domain name of the one or more domain names has not been queried by at least a threshold number of distinct hosts, the distinct hosts corresponding to unique IP addresses; and in the event that the domain name of the one or more domain names has not been queried by at least the threshold number of distinct hosts, removing the domain name from the one or more domain names; and automatically registering each of the one or more domain names with a domain registry to a sinkholed IP address in order to sinkhole each of the one or more domain names.

11. The method of claim 10, wherein the passive DNS data from the plurality of security devices includes DNS responses to DNS queries for non-existent domains (NXDOMAINs), and wherein each of the DNS responses includes a destination IP address that corresponds to a client device requesting a domain name resulting in an NXDOMAIN DNS response.

12. The method of claim 10, wherein the passive DNS data from the plurality of security devices includes DNS responses to DNS queries for non-existent domains (NXDOMAINs), wherein each of the DNS responses includes a destination IP address that corresponds to a client device requesting a domain name resulting in an NXDOMAIN DNS response, and wherein the distinct client devices are determined based on distinct IP addresses associated with DNS responses provided in the passive DNS data.

13. The method of claim 10, wherein the passive DNS data from the plurality of security devices is collected daily; and wherein the selected one or more domain names are the most commonly queried by distinct client devices based on the passive DNS data over a period of two or more consecutive days.

14. A computer program product for discovering and selecting candidates for sinkholing of network domains, the computer program product being embodied in a tangible computer readable storage medium and comprising computer instructions for:

collecting passive DNS data from a plurality of security devices to discover candidates for sinkholing of domain names;

selecting one or more domain names that are most commonly queried by distinct client devices based on the passive DNS data, wherein each of the one or more domain names is not yet registered, wherein the selecting of the one or more domain names that are most commonly queried comprises:

ranking commonly queried domain names based on number of queries by the distinct client devices; and selecting N most commonly queried domain names to obtain the one or more domain names, N being an integer greater than zero;

applying a Domain Generation Algorithm (DGA) filter to remove any DGA generated domain names from the candidates for sinkholing of domain names, wherein the DGA filter includes a plurality of DGA generated domain names based on an emulated analysis of malware, wherein the applying of the DGA filter comprises:

determining whether a domain name of the one or more domain names has not been queried by at least a threshold number of distinct hosts, the distinct hosts corresponding to unique IP addresses; and in the event that the domain name of the one or more domain names has not been queried by at least the threshold number of distinct hosts, removing the domain name from the one or more domain names; and automatically registering each of the one or more domain names with a domain registry to a sinkholed IP address in order to sinkhole each of the one or more domain names.

15. The computer program product recited in claim 14, wherein the passive DNS data from the plurality of security devices includes DNS responses to DNS queries for nonexistent domains (NXDOMAINs), and wherein each of the DNS responses includes a destination IP address that corresponds to a client device requesting a domain name resulting in an NXDOMAIN DNS response.

16. The computer program product recited in claim 14, wherein the passive DNS data from the plurality of security devices includes DNS responses to DNS queries for nonexistent domains (NXDOMAINs), wherein each of the DNS responses includes a destination IP address that corresponds to a client device requesting a domain name resulting in an NXDOMAIN DNS response, and wherein the distinct client devices are determined based on distinct IP addresses associated with DNS responses provided in the passive DNS data.

17. The computer program product recited in claim 14, wherein the passive DNS data from the plurality of security devices is collected daily; and wherein the selected one or more domain names are the most commonly queried by distinct client devices based on the passive DNS data over a period of two or more consecutive days.

* * * * *